(12) United States Patent
Molavi et al.

(10) Patent No.: US 11,514,223 B2
(45) Date of Patent: Nov. 29, 2022

(54) SYSTEMS AND METHODS TO EXTRACT QUBIT PARAMETERS

(71) Applicant: D-WAVE SYSTEMS INC., Burnaby (CA)

(72) Inventors: Reza Molavi, Vancouver (CA); Mark H. Volkmann, Burnaby (CA); Paul I. Bunyk, New Westminster (CA)

(73) Assignee: D-WAVE SYSTEMS INC., Burnaby (CA)

( * ) Notice: Subject to any disclaimer, the term of this patent is extended or adjusted under 35 U.S.C. 154(b) by 0 days.

(21) Appl. No.: 17/068,388

(22) Filed: Oct. 12, 2020

(65) Prior Publication Data
US 2021/0133385 A1    May 6, 2021

Related U.S. Application Data (60) Provisional application No. 62/930,316, filed on Nov. 4, 2019.

(51) Int. Cl.
| | |
|---|---|
| *G06F 30/398* | (2020.01) |
| *G06N 10/00* | (2022.01) |
| *G06F 30/392* | (2020.01) |
| *G06F 115/12* | (2020.01) |

(52) U.S. Cl.
CPC .......... *G06F 30/398* (2020.01); *G06F 30/392* (2020.01); *G06N 10/00* (2019.01); *G06F 2115/12* (2020.01)

(58) Field of Classification Search
CPC ..................................................... G06F 30/398
USPC ......................................................... 716/132
See application file for complete search history.

(56) References Cited

U.S. PATENT DOCUMENTS

| | | |
|---|---|---|
| 7,268,576 B2 | 9/2007 | Amin |
| 8,063,657 B2 | 11/2011 | Rose |
| 9,178,154 B2 | 11/2015 | Bunyk |
| 9,547,826 B2 | 1/2017 | King |
| 2007/0174227 A1* | 7/2007 | Johnson ................. G06N 10/00 706/62 |

FOREIGN PATENT DOCUMENTS

| | | |
|---|---|---|
| WO | 2005024716 | 3/2005 |
| WO | 2006066415 A1 | 6/2006 |
| WO | 2008083498 | 7/2008 |
| WO | 2009114805 | 9/2009 |
| WO | 2010028183 A2 | 3/2010 |

(Continued)

*Primary Examiner* — Eric D Lee
(74) *Attorney, Agent, or Firm* — Cozen O'Connor (57) ABSTRACT

Systems and methods are described to accurately extract device parameters and optimize the design of macroscopic superconducting structures, for example qubits. This method presents the advantage of reusing existing plaquettes to simulate different processor topologies. The physical elements of a qubits are extracted via plurality of plaquettes. Each plaquette contains at least one physical element of the qubit design and has two ports on each side. Each plaquette is concatenated to at least one other plaquette via two ports. The values of inductance (L), capacitance (C) and mutual inductance (M) and quantum critical point of the qubit design can be computed. Changing the physical elements of the qubit design and iterating the method allows to effortlessly refine the qubit design.

16 Claims, 4 Drawing Sheets

(56) References Cited

FOREIGN PATENT DOCUMENTS

| WO | 2015013441 | 1/2015 |
| WO | 2017214331 A1 | 12/2017 |
| WO | 2019126396 | 6/2019 |

* cited by examiner

SYSTEMS AND METHODS TO EXTRACT QUBIT PARAMETERS

FIELD

This disclosure generally relates to extract parameters of macroscopic superconducting structure designs.

BACKGROUND

Quantum Computation

A quantum computer is a system that makes direct use of at least one quantum-mechanical phenomenon, such as, superposition, tunneling, and entanglement, to perform operations on data. The elements of a quantum computer are qubits. Quantum computers can provide speedup for certain classes of computational problems such as computational problems simulating quantum physics.

Quantum Annealing

Quantum annealing is a computational method that may be used to find a low-energy state of a system, typically preferably the ground state of the system. Similar in concept to classical simulated annealing, the method relies on the underlying principle that natural systems tend towards lower energy states because lower energy states are more stable. While classical annealing uses classical thermal fluctuations to guide a system to a low-energy state, quantum annealing may use quantum effects, such as quantum tunneling, as a source of delocalization to reach an energy minimum more accurately and/or more quickly than classical annealing.

A quantum processor may be designed to perform quantum annealing and/or adiabatic quantum computation. An evolution Hamiltonian can be constructed that is proportional to the sum of a first term proportional to a problem Hamiltonian and a second term proportional to a delocalization Hamiltonian, as follows:

$$H_E \propto A(t)H_P + B(t)H_D$$

where $H_E$ is the evolution Hamiltonian, $H_P$ is the problem Hamiltonian, $H_D$ is the delocalization Hamiltonian, and A(t), B(t) are coefficients that can control the rate of evolution, and typically lie in the range [0,1].

In some implementations, a time varying envelope function can be placed on the problem Hamiltonian. A suitable delocalization Hamiltonian is given by:

$$H_D \propto \tfrac{1}{2}\sum_{i=1}^{N}\Delta_i \sigma_i^x$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms.

A common problem Hamiltonian includes a first component proportional to diagonal single qubit terms and a second component proportional to diagonal multi-qubit terms, and may be of the following form:

$$H_P \propto -\frac{\varepsilon}{2}\left[\sum_{i=1}^{N} h_i \sigma_i^z + \sum_{j>i}^{N} J_{ij}\sigma_i^z\sigma_j^z\right]$$

where N represents the number of qubits, $\sigma_i^z$ is the Pauli z-matrix for the $i^{th}$ qubit, $h_i$ and $J_{ij}$ are dimensionless local fields for the qubits, and couplings between qubits, and E is some characteristic energy scale for $H_P$.

Here, the $\sigma_i^z$ and $\sigma_i^z\sigma_j^z$ terms are examples of "diagonal" terms. The former is a single qubit term and the latter a two qubit term.

Throughout this specification, the terms "problem Hamiltonian" and "final Hamiltonian" are used interchangeably unless the context dictates otherwise. Certain states of the quantum processor are, energetically preferred, or simply preferred by the problem Hamiltonian. These include the ground states but may include excited states.

Hamiltonians such as $H_D$ and $H_P$ in the above two equations, respectively, may be physically realized in a variety of different ways. A particular example is realized by an implementation of superconducting qubits.

Superconducting Qubits

Superconducting qubits are solid state qubits based on circuits of superconducting materials. Operation of superconducting qubits is based on the underlying principles of magnetic flux quantization, and Josephson tunneling. Superconducting effects can be present in different configurations, and can give rise to different types of superconducting qubits including flux, phase, charge, and hybrid qubits. The different configurations can vary in the topology of the loops, the placement of the Josephson junctions, and the physical parameters of elements of the superconducting circuits, such as inductance, capacitance, and Josephson junction critical current.

Quantum Processor

A quantum processor may take the form of a superconducting quantum processor. A superconducting quantum processor may include a number of superconducting qubits and associated local bias devices. A superconducting quantum processor may also include coupling devices (also known as couplers) that selectively provide communicative coupling between qubits.

In one implementation, the superconducting qubit includes a superconducting loop interrupted by a Josephson junction. The ratio of the inductance of the Josephson junction to the geometric inductance of the superconducting loop can be expressed as $2\pi L I_C/\Phi_0$ (where L is the geometric inductance, $I_C$ is the critical current of the Josephson junction, and $\Phi_0$ is the flux quantum). The inductance and the critical current can be selected, adjusted, or tuned, to increase the ratio of the inductance of the Josephson junction to the geometric inductance of the superconducting loop, and to cause the qubit to be operable as a bistable device. In some implementations, the ratio of the inductance of the Josephson junction to the geometric inductance of the superconducting loop of a qubit is approximately equal to three.

In one implementation, the superconducting coupler includes a superconducting loop interrupted by a Josephson junction. The inductance and the critical current can be selected, adjusted, or tuned, to decrease the ratio of the inductance of the Josephson junction to the geometric inductance of the superconducting loop, and to cause the coupler to be operable as a monostable device. In some implementations, the ratio of the inductance of the Josephson junction to the geometric inductance of the superconducting loop of a coupler is approximately equal to, or less than, one.

Further details and embodiments of example quantum processors that may be used in conjunction with the present systems and devices are described in, for example, U.S. Pat. Nos. 7,533,068; 8,008,942; 8,195,596; 8,190,548; and 8,421,053.

The foregoing examples of the related art and limitations related thereto are intended to be illustrative and not exclusive. Other limitations of the related art will become appar-

BRIEF SUMMARY

A method of operation in a digital processor to extract parameters and optimize a design of a macroscopic superconducting structure is described. The macroscopic superconducting structure design may comprise a plurality of physical elements. The method may be executed by a digital processor. The method may comprise: forming a plurality of plaquettes, each plaquette representing at least one physical element of the macroscopic superconducting structure design and having at least two ports, each plaquette concatenated to at least one other plaquette via the at least two ports; and obtaining a representation of the macroscopic superconducting structure design from the plurality of plaquettes. The digital process may form the plurality of plaquettes via an electromagnetic simulator and obtain a representation of the macroscopic superconducting structure design from the plurality of plaquettes via a circuit simulator. The macroscopic superconducting structure design may be a qubit. The plurality of physical elements of a qubit design may comprise compound-compound Josephson junctions, Ip-compensators, inductance tuners, flux bias, readout elements, external coupling devices and internal coupling devices.

The method may further comprise extracting a value of inductance (L), a value of capacitance (C) of the qubit design and a value of a mutual inductance M between at least one physical element communicatively coupled to the qubit design and the qubit design; computing one or more energy scales of the qubit design from a quantum modeling environment via the extracted values of L, C and M; computing a quantum critical point; and determining whether the quantum critical point is greater than a minimum threshold value. Computing one or more energy scales of the qubit design may comprise computing one or more expected qubit Hamiltonian waveforms as a function of annealing flux. Computing a quantum critical point may comprise calculating an intersection between a driver Hamiltonian and a problem Hamiltonian. Extracting a value of a mutual inductance M between at least one physical element communicatively coupled to the qubit design and the qubit design may comprise extracting a value of a mutual inductance M between at least one coupling device communicatively coupled to the qubit design and the qubit design. The method may further comprise: in response to determining that the quantum critical point is smaller than a minimum threshold value, iteratively changing a design of at least one of the physical elements of the qubit design to obtain a revised qubit design; forming a revised plurality of plaquettes, the revised plurality of plaquettes comprising at least one revised plaquette, representing the at least one changed physical element of the revised qubit design, each plaquette having at least two ports, each plaquette concatenated to another plaquette via the at least two ports; obtaining a revised representation of the revised the qubit design from the revised plurality of plaquettes; extracting a value of inductance (L), a value of capacitance (C) of the revised qubit design and a value of a mutual inductance M between at least one physical element communicatively coupled to the revised qubit design and the revised qubit design; computing one or more energy scales of the revised qubit design from a quantum modeling environment via the extracted values of L, C and M; computing a quantum critical point of the revised qubit design; and determining whether the quantum critical point is greater than a minimum threshold value. Changing a design of at least one of the physical elements of the qubit design to obtain a revised qubit design may comprise adding additional L-tuners, removing L-tuners, changing the design of the coupling devices, changing a magnitude of an induction coil between the qubit and a first element of a readout. Forming a plurality of plaquettes may comprise forming at least one of: a compound-compound Josephson junctions plaquette, an Ip-compensator plaquette, an inductance tuner plaquette, a flux bias plaquette, a readout plaquette, an internal coupler plaquette and an external coupler plaquette.

A system comprises at least one digital processor; and at least one non-transitory processor-readable medium communicatively coupleable to the at least one digital processor and that stores at least one of the processor-executable instructions or data which, when executed by the at least one digital processor, causes the at least one digital processor to: form a plurality of plaquettes, each plaquette representing at least one physical element of a macroscopic superconducting structure design, the macroscopic superconducting structure design comprising a plurality of physical elements, each plaquette having at least two ports, and each plaquette concatenated to at least one other plaquette via the at least two ports; and obtain a representation of the macroscopic superconducting structure design from the plurality of plaquettes. The plurality of plaquettes may be formed via an electromagnetic simulator. A representation of the macroscopic superconducting structure may be obtained from the plurality of plaquettes via a circuit simulator. The macroscopic superconducting structure design may be a qubit design. At least one physical element of a qubit design may be selected from a group consisting of: compound-compound Josephson junctions, Ip-compensators, inductance tuners, flux bias, readout elements, external couplers and internal couplers. The digital processor may further: extract a value of inductance (L), a value of capacitance (C) of the qubit design and a value of a mutual inductance M between at least one physical element communicatively coupled to the qubit design and the qubit design using the plurality of plaquettes; compute one or more energy scales of the qubit design from a quantum modeling environment via the extracted values of L, C and M; compute a quantum critical point; and determine whether the quantum critical point is greater than a minimum threshold value. The one or more energy scales of the qubit design may be computed by computing one or more expected qubit Hamiltonian waveforms as a function of annealing flux. The quantum critical point may be computed by calculating an intersection between a driver Hamiltonian and a problem Hamiltonian. The digital processor may extract a value of a mutual inductance M between at least one coupling device communicatively coupled to the qubit design and the qubit design. The digital processor may further: in response to determining that the quantum critical point is smaller than a minimum threshold value, iteratively change a design of at least one of the physical elements of the qubit design to obtain a revised qubit design; form a revised plurality of plaquettes, the revised plurality of plaquettes comprising at least one revised plaquette, representing the at least one changed physical element of the revised qubit design, each plaquette having at least two ports, each plaquette concatenated to another plaquette via the at least two ports; obtain a revised representation of the revised qubit design from the revised plurality of plaquettes; extract a value of inductance (L), a value of capacitance (C) of the revised qubit design and a value of a mutual inductance M between at least one physical element communicatively coupled to the revised qubit design and the revised qubit design; compute one or more energy scales of the revised qubit design from a quantum modeling environment via the extracted values of L, C and M; compute a quantum critical point of the revised qubit design; and determine whether the quantum critical point is greater than a minimum threshold value. Changing the qubit design to obtain a revised qubit design may comprise adding additional L-tuners, removing L-tuners, changing the design of the couplers, changing a magnitude of an induction coil between the qubit and a first element of the readout. The plurality of plaquettes may be formed from a group comprising: a compound-compound Josephson junctions plaquette, an Ip-compensator plaquette, an inductance tuner plaquette, a flux bias plaquette, a one readout plaquette, an internal coupler plaquette and an external coupler plaquette.

BRIEF DESCRIPTION OF THE SEVERAL
VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

When designing a computing system, for example a quantum processor that includes devices such as qubits and couplers, it is desirable to accurately design device parameters before fabricating them. This design effort becomes even more significant when the scale (e.g., the complexity) of a processor increases compared to previous generations of processors. For example, when designing a quantum processor with increased qubit connectivity, the length of the qubits might increase compared to previous generations of processors to accommodate an increased number of coupling devices communicatively coupled to individual qubits. The increased length of the qubits and increased connectivity may cause an undesired increase in some qubit parameters, for example qubit inductance (L) and capacitance (C). Therefore, it is desirable to design these and other qubit parameter to ensure their value is suitable for the desired characteristics of the quantum the processor.

Several commercial solutions, for example FastHenry, ATLC, HFSS, are available to simulate electrical circuits and can be used to extract the inductance and capacitance of individual qubits in a quantum processor design. However, due to the increased complexity of a new processor design's qubits, designing the entire length of a qubit, including peripheral devices communicatively coupled to it, becomes very convoluted and difficult to implement. An approach to reduce this complexity is to rely on simplistic analytical expressions and predictions to approximate the inductance (L) and capacitance (C) of qubits. However, this approach provides low accuracy in the value of L and C. In addition, in the cases where qubits are operating in an isolated environment (e.g., a magnetic and/or a cryogenic environment), this approach neglects the existence of a shield plane near the qubits.

While both analytical and CAD methods can be used to extract parameters of qubits, both methods have significant shortcomings. Analytical methods often ignore the loading of peripheral devices (e.g., couplers, QFPs, etc.) on the capacitance of a qubit and may only be applicable to small and simple geometries, such as, for example, transmission lines. CAD methods rely on simple structures for extracting the inductance and capacitance values per unit length and extrapolate those values for much longer, more complex qubit geometries; thus, they may be prone to configuration errors and may incur in long simulation time for realistic qubit lengths. Additionally, ad-hoc CAD modeling methods of estimating L and C for different sections of a qubit may result in an inaccurate representation of the physical qubit.

The present discourse describes systems and methods to extract device parameters (e.g., inductance, capacitance of qubits and mutual inductance between coupling devices and the qubit body) by dividing a device into multiple fragment, each fragment representing one or more physical elements of the device, concatenated to represent the device. To properly extract parameters, these fragments are simulated into an electromagnetic (EM) environment (e.g., HFSS), to build plaquettes with at least two ports. In the present disclosure and the appended claims, the term 'plaquette' or 'plaquettes' is used to describe a data structure to optimize the design of microscopic superconducting structures. For at least some of the plaquettes (e.g. inner plaquettes) a total of four ports per plaquette is present. This model allows for accurate simulation of impedance to neighboring shield for each fragment of a qubit geometry. The plaquettes allow for customized variation of qubits by connecting plaquettes together, where a plaquettes is linked to another plaquette by two ports. A circuit simulator (e.g., SPICE) can then use the plaquettes to build test benches.

In one implementation, the plaquettes may be implemented as a linked list where each element contains the data of one or more of the physical elements it represents (e.g., parameters of an internal coupling device, parameters of an internal coupling device and an IP-compensator, etc.) and a reference to the next element in the list. For at least some of the plaquettes (e.g., inner plaquettes with four ports), a reference to the previous element of the list in also included.

In at least one implementation, the plaquettes may be stored in a memory system; thus, allowing reuse of plaquettes to optimize different qubit topologies, for example, topologies where qubits comprise physical elements at different locations.

This method presents the advantage of reusing existing plaquettes to simulate different processor topologies. For example, in a topology where some qubits have different physical elements, or some physical elements are communicatively coupled at different locations across the body of the qubit, it becomes possible to obtain accurate values of inductance (L), capacitance (C) and mutual inductance (M) without the need to re-iterate computationally intensive CEM simulations of each qubit, or part of a qubit, design. Additionally, the 4-port characterization for individual qubit pieces captures both common-mode and differential characteristic of a qubit. In the differential mode of operation, electrical current flows through one leg of the body of the qubit and returns though a second leg of the body of the qubit. In common-mode of operation, electrical current travels in phases along the body of the qubit and returns via the shield plane, resulting in extra capacitance.

The values of L, C and M extracted from the circuit simulator (e.g., SPICE), can then be used in a quantum modeling environment to provide expected qubit Hamiltonian waveforms (i.e., a driver Hamiltonian and a problem Hamiltonian) as a function of annealing flux. A quantum modeling environment, also herein referred to as a RF-Squid modeling environment, is a quantum analytics solver to derive the different energy levels of a qubit by plotting the problem Hamiltonian energy of a qubit versus the tunneling energy of the qubit. The intersection of the two Hamiltonians, denominated as the Quantum Critical Point (QCP), is the value that quantifies the quantum properties of a qubit. For example, if it is desirable that a processor operates as a quantum annealer, rather than a thermal annealer, the value of the QCP of the qubits in the processor needs to be greater than the frequency corresponding to the thermal environment of the processor. Changing the physical geometry of the initial qubit design, for example in response to the determination that the computed QCP is below a desired threshold, will lead to an updated QCP value. Qubit parameters can be optimized to achieve a desired value of QCP by iterating the method described herein. Examples of changing the physical geometry of the qubit design can include: adding additional L-tuners or removing L-tuners, changing the design of the coupling devices (e.g., galvanic or magnetic couplers), changing the magnitude of the induction coil between the qubit and the first element (e.g., a QFP) of the readout. When physical elements of the qubit designs are changed, only the plaquettes representing the changed physical elements are updated, while all the other plaquettes may be reused in further iterations of the method describe herein; thus, avoiding at least partially reducing computation time compared to currently available solutions.

Figure 1:
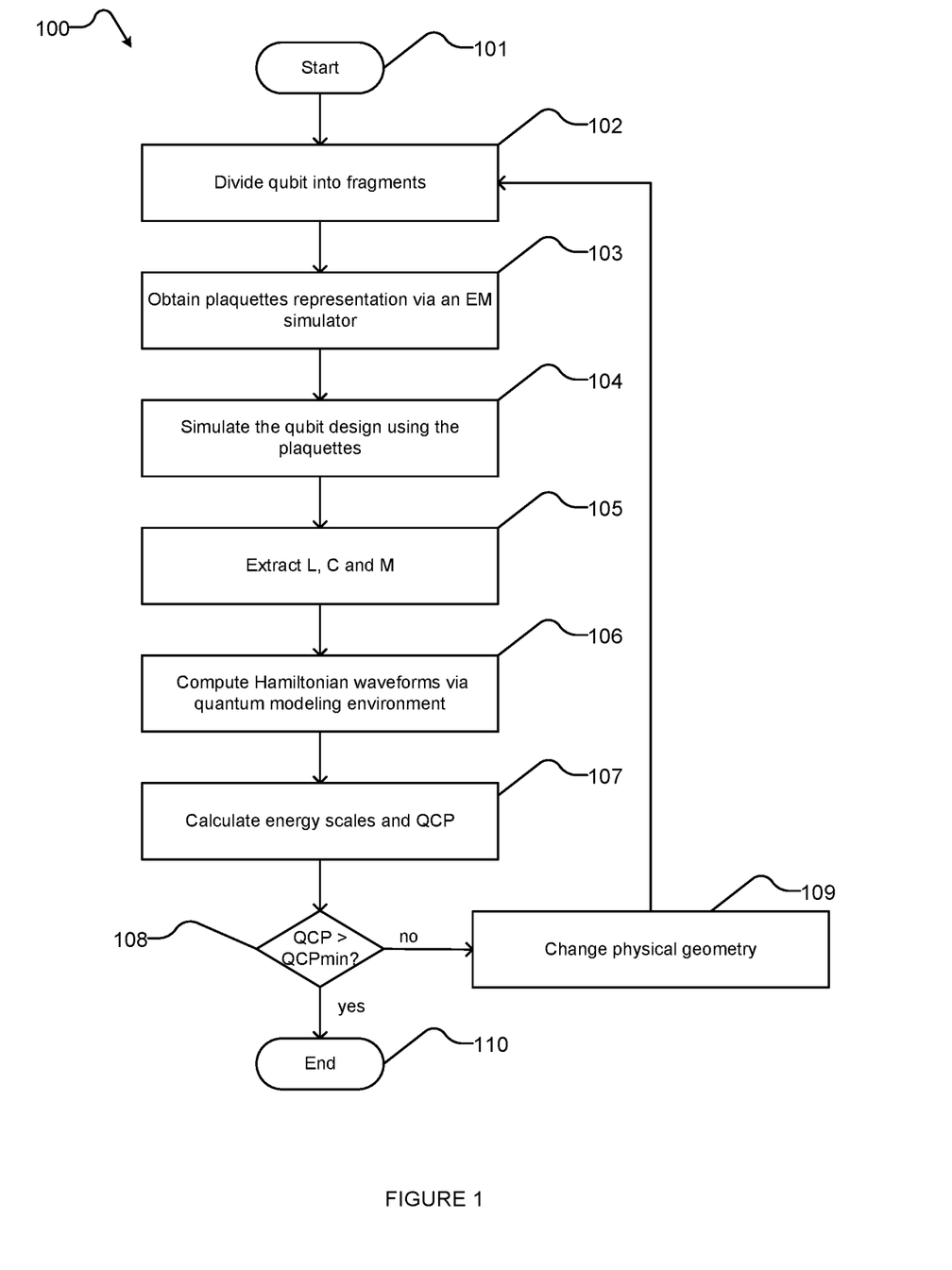
FIG. 1 is a flow diagram of an example method to model qubit parameters.

FIG. 1 is a flow diagram of an example method 100 to extract device parameters, in accordance with the present systems and methods. Method 100 may be executed by a computing system including one or more digital processors, and one or more non-transitory computer-readable storage medium. Method 100 comprises acts 101 to 110; however, a person skilled in the art will understand that the number of acts is an example, and, in some implementations, certain acts may be omitted, further acts may be added, and/or the order of the acts may be changed. Method 100 may be applied to extract device parameters of macroscopic superconducting structure designs, for example qubit or coupler designs. Method 100 will be described with reference to modeling qubit parameters.

Method 100 starts at 101, for example in response to a call from another routine.

Figure 2:
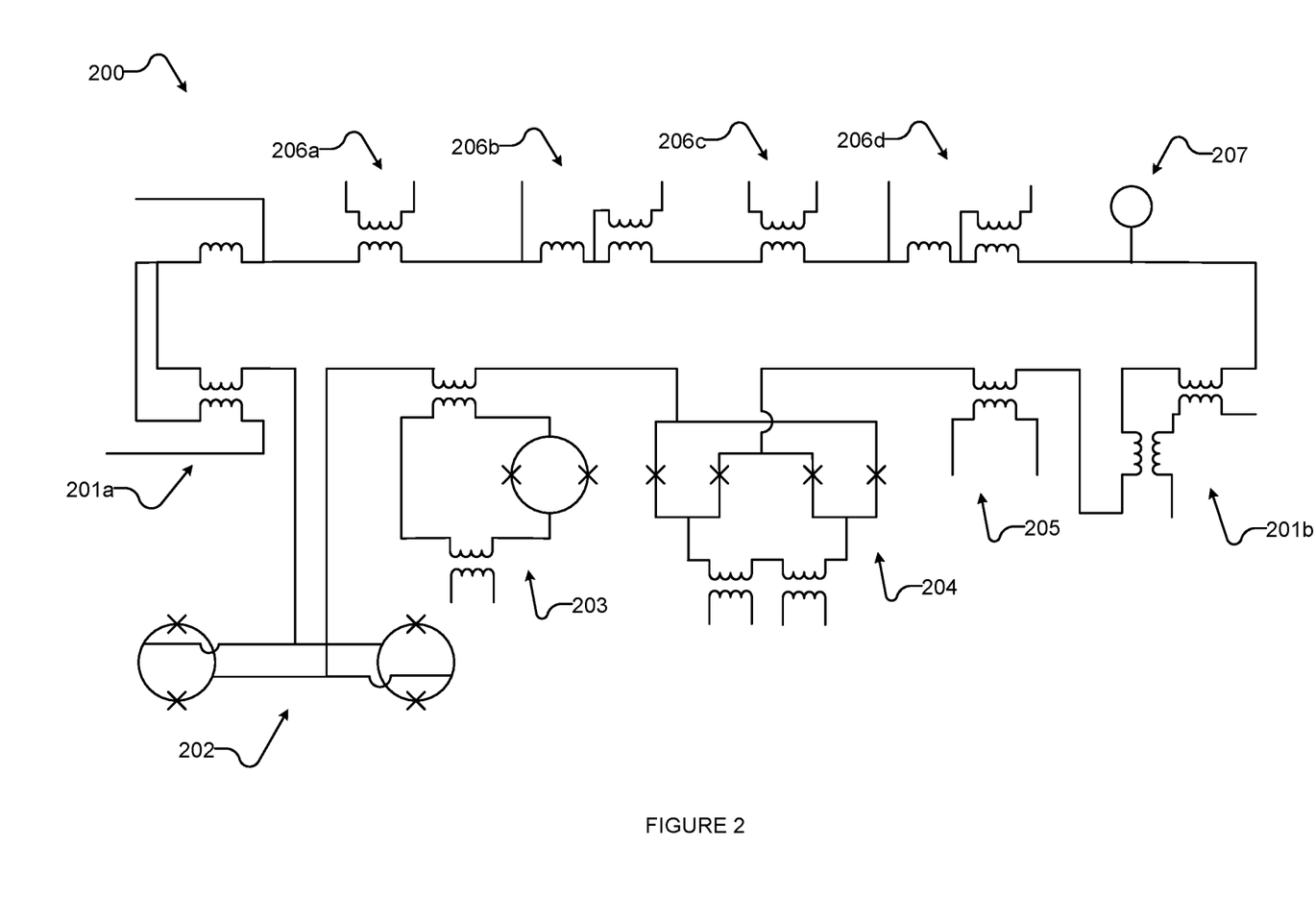
FIG. 2 is a circuit diagram of an example qubit design.
Figure 3:
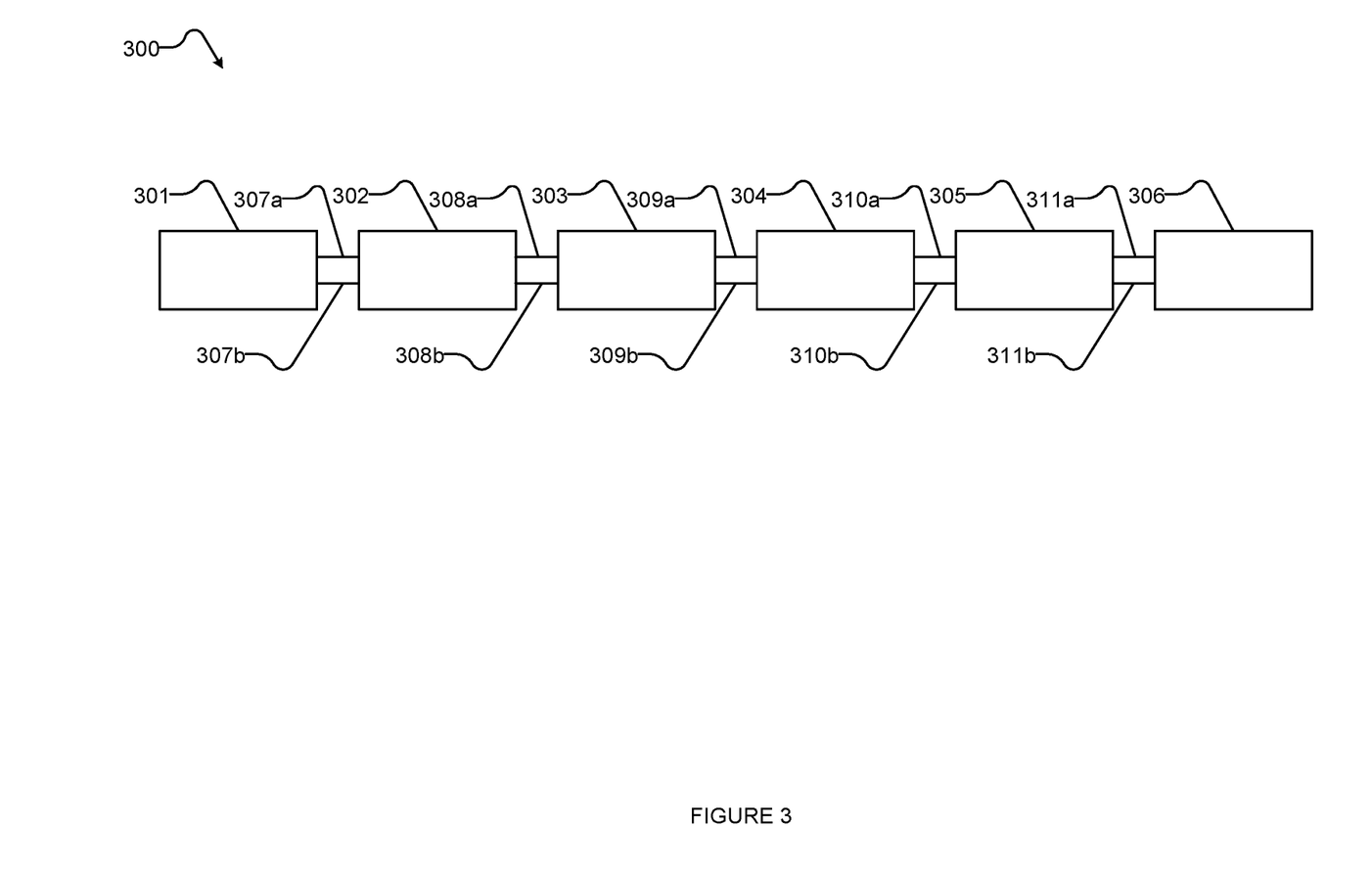
FIG. 3 is a representation of the qubit design of FIG. 2 as plurality of interconnected plaquettes.

At 102, the digital processor divides a qubit design into fragments. The qubit design may be supplied by a user or by another computer program. Each fragment can represent one or more physical elements of the qubit design, concatenated to represent the entire qubit design. An example qubit design is shown in FIG. 2. An example of a division of the qubit design of FIG. 2 is shown in FIG. 3. A person skilled in the art will understand that different ways of dividing a qubit design into fragments may be employed and that FIG. 3 is shown as an example only. Optionally, method 100 receives the plurality of fragments as part of a set on inputs and method 100 starts at 103.

At 103, the digital processor uses an electromagnetic (EM) simulator, for example HFSS or another 3D EM simulator, to obtain a representation of the qubit design as a concatenation of plaquettes including one or more plaquettes. Each plaquette is simulated from a different fragment, obtained at 102. Inner plaquettes are concatenated to two other plaquettes via four ports, where the inner plaquette is connected to a first plaquette via a first set of two ports and to a second plaquette via a second set of two ports. This model allows for accurate simulation of impedance to any neighboring shield for each fragment of a qubit geometry. The plaquettes allow for customized variation of qubits by connecting plaquettes together. The two outer or end-most plaquettes, one position at either end of the design, are concatenated to only one other plaquette via two ports, as shown in more details in FIG. 3.

Figure 4:
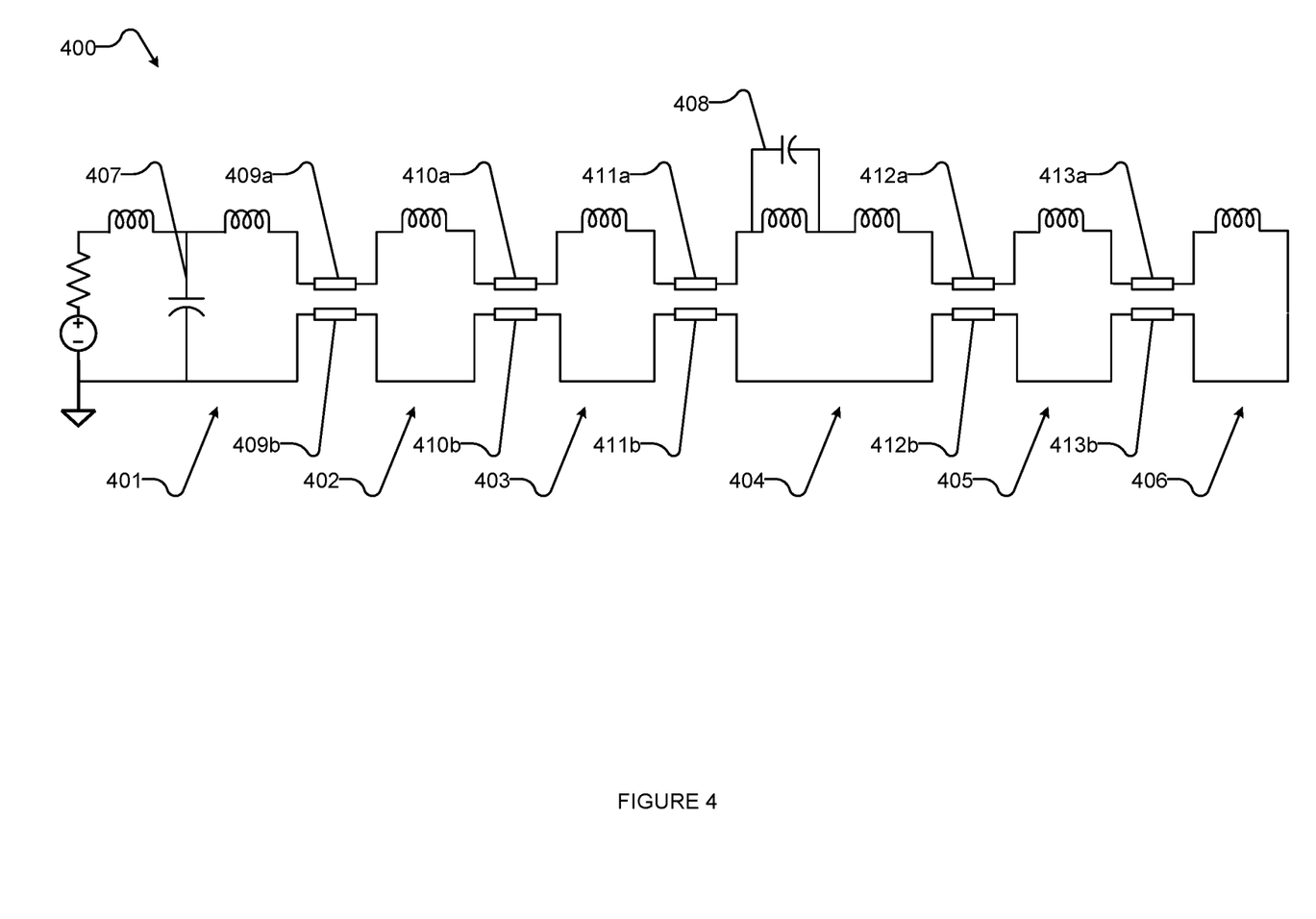
FIG. 4 is a circuit simulation of the qubit design of FIG. 2 using the plaquettes of FIG. 3.

At 104, the digital processor uses a circuit simulator, for example SPICE, the to build test benches from the plaquettes obtained at 103. The order at which plaquettes appear in the circuit simulator corresponds to the physical layout arrangement, as shown In FIGS. 2, 3 and 4.

At 105, the digital processor extracts or computes the values of the parameters of the qubit design. In some implementations, the digital processor extracts or computes the value of inductance (L) and capacitance (C) of the qubit design and a value of a mutual inductance M between at least one coupling device communicatively coupled to the qubit design and the qubit design from the circuit simulation of 104. The digital processor may build a matrix of parameter values between each of the at least two ports of the plaquettes obtained at 103 and use analytical methods to extract the desired parameters. At 106, the digital processor uses the values of L, C and M computed at 105 in a quantum modeling environment to provide expected qubit Hamiltonian waveforms as a function of annealing flux. In some implementations, the values of L, C and M are used to derive the different energy levels of a qubit by plotting the problem Hamiltonian energy of a qubit versus the tunneling energy of the qubit.

At 107, the digital processor computes the energy scales and the Quantum Critical Point (QCP) of the qubit design. The QCP is the value that quantifies the quantum properties of a qubit and is the intersection of the driver Hamiltonian and the problem Hamiltonian.

At 108, the digital processor determines whether the QCP is larger or equal a minimum value. The minimum value can be defined as a value greater than the thermal excitation energy. If the QCP is smaller than a minimum value, control passes to 109, otherwise to 110.

At 109, the digital processor updates the qubit design received at 102 by changing the physical geometry of the qubit design, in an effort to improve the QCP. Examples of changing the physical geometry of the qubit design can include: adding additional L-tuners or removing L-tuners, changing the design of the coupling devices (e.g., galvanic or magnetic couplers), changing the magnitude of the induction coil between the qubit and the first element (e.g., a QFP) of the readout. After act 109, control passes to 102, where the updated qubit design is fragmented again. Depending on the changes to the qubit design, only the plaquettes representing the updated physical elements of the qubit design need to be updated, while the reminder of the plaquettes may be reused, advantageously reducing computational complexity and at least partially reducing computation time compared to currently available solutions.

At 110, method 100 terminates, until it is, for example, invoked again.

FIG. 2 is a circuit diagram of an example qubit design 200. Qubit design 200 may be a design for a qubit in a new processor and, therefore, it may be desirable to accurately extract qubit design parameters ahead of fabricating a physical qubit based on qubit design 200. A person skilled in the art will understand that qubit design 200 is an example of a possible qubit design and will be described in the present disclosure to show how method 100 may be applied.

Qubit design 200 comprises two external couplers 201a and 201b (collectively, 201), that communicatively couple qubit design 200 with another qubit in another cell. A cell is defined in the present disclosure as a repeated sub-topology of a quantum processor topology comprising qubits, couplers and other devices. A plurality of cells tiled over an area produces a certain quantum processor architecture or topology. Examples of external couplers and cells can be found in International Patent Publication No. WO2017214331A1, International Patent Publication No. WO2006066415A1, International Patent Application No. WO2008083498A1, U.S. Pat. No. 8,063,657, International Patent Application No. WO2009114805A2, U.S. Pat. Nos. 9,178,154, 9,547, 826.

Qubit design 200 comprises a compound-compound Josephson junction (CCJJ) 202, an Ip-compensator 203, an inductance tuner (L-tuner) 204, a flux bias 205, four internal couplers 206a-206d (collectively, 206) that communicatively couple qubit design 200 to other qubits in the same cell. Qubit design 200 also comprises a readout 207. A person skilled in the art will understand that the various elements of qubit design 200 and their location respective to one another is illustrated in FIG. 2 as an example and different elements, or a different number of elements, at a different location is also possible. Other examples of qubit design can be found in International Patent Publication No. WO 2005024716A1, U.S. Pat. No. 7,268,576, International Patent Publication No. WO 2010028183A2, International Patent Publication No. WO2015013441, and International Patent Publication No. WO2019126396A1.

FIG. 3 is a representation 300 of qubit design 200 of FIG. 2 as plurality of interconnected plaquettes. Representation 300 is one a number of possible representations of qubit design 200, where different representations may have different number of plaquettes. Representation 300 will be described with reference to qubit design 200. Representation 300 is obtained at act 103 of method 100 of FIG. 1.

Representation 300 comprises a CCJJ plaquette 301, a coupler plaquette 302, an Ip-compensator plaquette 303, an L-tuner plaquette 304, a flux bias plaquette 305 and a readout plaquette 306.

CCJJ plaquette 301 is a representation of CCJJ 202 of FIG. 2, including external coupler 201a, and is concatenated to coupler plaquette 302 via ports 307a and 307b (collectively, 307). Coupler plaquette 302 is a representation of internal couplers 206 and is concatenated to Ip-compensator plaquette 303 via ports 308a and 308b (collectively, 308). Ip-compensator plaquette 303 is a representation of Ip-compensator 203 of FIG. 2. Ip-compensator plaquette 303 is concatenated to L-tuner plaquette 304 via ports 309a and 309b (collectively, 309). L-tuner plaquette 304 is a representation of L-Tuner 204 of FIG. 2. L-tuner plaquette 304 is concatenated to flux-bias plaquette 305 via ports 310a and 310b (collectively, 310). Flux-bias plaquette 305 is a representation of flux-bias 205 of FIG. 2. Flux-bias plaquette 305 is concatenated to readout plaquette 306 via ports 311a and 311b (collectively, 311). Readout plaquette 306 is a representation of readout 207 of Figure. External coupler 201b may be included in a plaquette in another qubit design representation (not shown in FIG. 3). In some implementations, Ip-compensator plaquette 303, L-tuner plaquette 304, flux-bias plaquette 305 or readout plaquette 306 also comprise one or more internal couplers 206.

In an alternative representation, external couplers 201 may be represented by a separate plaquette and placed at a location representative of their physical location on qubit design 200 of FIG. 2.

FIG. 4 is a circuit simulation 400 of qubit design 200 of FIG. 2 using the plaquettes representation 300 of FIG. 3. Circuit simulation 400 is obtained at act 104 of method 100 of FIG. 1.

Circuit simulation 400 comprises a CCJJ element 401, an Ip-compensator element 403, an L-tuner element 404, a flux bias element 405 and a readout element 406. CCJJ element 401 corresponds to CCJJ plaquette 301 of FIG. 3, coupler element 402 corresponds to coupler plaquette 302 of FIG. 3, Ip-compensator element 403 corresponds to Ip-compensator plaquette 303 of FIG. 3, L-tuner element 404 corresponds to L-tuner plaquette 304 of FIG. 3, flux bias element 405 corresponds to flux bias plaquette 305 of FIG. 3, and readout element 406 corresponds to readout plaquette 306 of FIG. 3. In some simulations, CCJJ element 401 comprises a capacitance 407 to simulate the equivalent internal capacitance of CCJJ 202 of FIG. 2. L-tuner element 404 comprises a capacitance 408 to simulate the equivalent internal capacitance of L-tuner 204 of FIG. 2.

CCJJ element 401 is concatenated to a coupler element 402 via ports 409a and 409b (collectively, 409), and it is a circuit simulation of CCJJ plaquette 301 of FIG. 3. Coupler element 402 is concatenated to Ip-compensator element 403 via ports 410*a* and 410*b* (collectively, 410), and is a circuit simulation of coupler plaquette 302 of FIG. 3. Ip-compensator element 403 is concatenated to L-tuner element 404 via ports 411*a* and 411*b* (collectively, 411), and is a circuit simulation of Ip-compensator plaquette 303 of FIG. 3. L-tuner element 404 is concatenated to flux bias element 405 via ports 412*a* and 412*b* (collectively, 412), and is a circuit simulation of L-tuner plaquette 304 of FIG. 3. Flux-bias element 405 is concatenated to readout element 406 via ports 413*a* and 413*b* (collectively, 413), and is a circuit simulation of flux-bias plaquette 305 of FIG. 3. Readout element 406 is a circuit simulation of readout plaquette 306 of FIG. 3.

A person skilled in the art will understand that the location of each element and the position of each element with respect to one another is representative of qubit design 200 of FIG. 2 and plaquette representation 300 of FIG. 3. An alternative representation 300, for example a representation comprising a different number of plaquettes, will result in a different circuit simulation 400.

Circuit simulation 400 may be used at acts 105, 106 and 107 of method 100 of FIG. 1 to compute the parameters and verify the quantum properties of qubit design 200.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for example purposes only and may change in alternative examples. Some of the example acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the example methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to: U.S. Provisional Application No. 62/930,316, International Patent Publication No. WO2017214331A1, International Patent Publication No. WO2006066415A1, International Patent Application No. WO2008083498A1, U.S. Pat. No. 8,063,657, International Patent Application No. WO2009114805A2, U.S. Pat. Nos. 9,178,154, 9,547,826, International Patent Publication No. WO 2005024716A1, U.S. Pat. No. 7,268,576, International Patent Publication No. WO 2010028183A2, International Patent Publication No. WO2015013441, and International Patent Publication No. WO2019126396A1.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operation in a digital processor to extract parameters and optimize a design of a macroscopic superconducting structure, the macroscopic superconducting structure design comprising a plurality of physical elements, the method executed by a digital processor, the method comprising:

forming a plurality of plaquettes, each plaquette representing at least one physical element of a qubit design and having at least two ports, each plaquette concatenated to at least one other plaquette via the at least two ports;

obtaining a representation of the qubit design from the plurality of plaquettes;

extracting a value of inductance (L), a value of capacitance (C) of the qubit design and a value of a mutual inductance M between at least one physical element communicatively coupled to the qubit design and the qubit design;

computing one or more energy scales of the qubit design from a quantum modeling environment via the extracted values of L, C and M;

computing a quantum critical point and determining whether the quantum critical point is greater than a minimum threshold value.

2. The method of claim 1 wherein forming a plurality of plaquettes includes forming the plurality of plaquettes via an electromagnetic simulator; and obtaining a representation of the qubit design from the plurality of plaquettes via a circuit simulator.

3. The method of claim 1 wherein forming a plurality of plaquettes, each plaquette representing at least one physical element of a qubit design, includes forming the plurality of plaquettes, each plaquette representing at least one physical element of a qubit design selected from a group of physical elements consisting of: compound-compound Josephson junctions, Ip-compensators, inductance tuners, flux bias, readout elements, external coupling devices and internal coupling devices.

4. The method of claim 1 wherein computing one or more energy scales of the qubit design includes computing one or more expected qubit Hamiltonian waveforms as a function of annealing flux.

5. The method of claim 1 wherein computing a quantum critical point includes calculating an intersection between a driver Hamiltonian and a problem Hamiltonian.

6. The method of claim 1 wherein extracting a value of a mutual inductance M between at least one physical element communicatively coupled to the qubit design and the qubit design includes extracting the value of a mutual inductance M between at least one coupling device communicatively coupled to the qubit design and the qubit design.

7. The method of claim 1 further comprising:
in response to determining that the quantum critical point is smaller than a minimum threshold value, iteratively changing a design of at least one of the physical elements of the qubit design to obtain a revised qubit design;
forming a revised plurality of plaquettes, the revised plurality of plaquettes comprising at least one revised plaquette, representing the at least one changed physical element design of the revised qubit design, each plaquette having at least two ports, each plaquette concatenated to another plaquette via the at least two ports;
obtaining a revised representation of the revised the qubit design from the revised plurality of plaquettes;
extracting a value of inductance (L), a value of capacitance (C) of the revised qubit design and a value of a mutual inductance M between at least one physical element communicatively coupled to the revised qubit design and the revised qubit design;
computing one or more energy scales of the revised qubit design from a quantum modeling environment via the extracted values of L, C and M;
computing a quantum critical point of the revised qubit design; and
determining whether the quantum critical point is greater than a minimum threshold value.

8. The method of claim 7 wherein changing a design of at least one of the physical elements of the qubit design to obtain a revised qubit design includes adding additional L-tuners, removing L-tuners, changing the design of coupling devices, and changing a magnitude of an induction coil between the qubit and a first element of a readout.

9. A system comprising:
at least one digital processor; and
at least one non-transitory processor-readable medium communicatively coupleable to the at least one digital processor and that stores at least one processor-executable instruction or data which, when executed by the at least one digital processor, causes the at least one digital processor to:
form a plurality of plaquettes, each plaquette representing at least one physical element of a qubit design, the qubit design comprising a plurality of physical elements, each plaquette having at least two ports, and each plaquette concatenated to at least one other plaquette via the at least two ports;
obtain a representation of the qubit design from the plurality of plaquettes;
extract a value of inductance (L), a value of capacitance (C) of the qubit design and a value of a mutual inductance M between at least one physical element communicatively coupled to the qubit design and the qubit design using the plurality of plaquettes;
compute one or more energy scales of the qubit design from a quantum modeling environment via the extracted values of L, C and M;
compute a quantum critical point; and
determine whether the quantum critical point is greater than a minimum threshold value.

10. The system of claim 9 wherein the at least one non-transitory processor-readable medium communicatively coupleable to the at least one digital processor and that stores at least one processor-executable instruction or data which, when executed by the at least one digital processor, causes the at least one digital processor to: form the plurality of plaquettes via an electromagnetic simulator; and obtain a representation of the qubit design from the plurality of plaquettes via a circuit simulator.

11. The system of claim 9 wherein the at least one non-transitory processor-readable medium communicatively coupleable to the at least one digital processor and that stores at least one processor-executable instruction or data which, when executed by the at least one digital processor, causes the at least one digital processor to form the plurality of plaquettes, each plaquette containing at least one physical element of a qubit design selected from a group consisting of: compound-compound Josephson junctions, Ip-compensators, inductance tuners, flux bias, readout elements, external couplers and internal couplers.

12. The system of claim 9 wherein the at least one non-transitory processor-readable medium communicatively coupleable to the at least one digital processor and that stores at least one processor-executable instruction or data which, when executed by the at least one digital processor, causes the at least one digital processor to compute one or more energy scales of the qubit design by computing one or more expected qubit Hamiltonian waveforms as a function of annealing flux.

13. The system of claim 9 wherein the at least one non-transitory processor-readable medium communicatively coupleable to the at least one digital processor and that stores at least one processor-executable instruction or data which, when executed by the at least one digital processor, causes the at least one digital processor to compute the quantum critical point by calculating an intersection between a driver Hamiltonian and a problem Hamiltonian.

14. The system of claim 9 the at least one non-transitory processor-readable medium communicatively coupleable to the at least one digital processor and that stores at least one processor-executable instruction or data which, when executed by the at least one digital processor, causes the at least one digital processor to extract the value of a mutual inductance M between at least one coupling device communicatively coupled to the qubit design and the qubit design.

15. The system of claim 9 wherein the at least one non-transitory processor-readable medium communicatively coupleable to the at least one digital processor and that stores at least one processor-executable instruction or data which, when executed by the at least one digital processor, further causes the at least one digital processor to:
in response to determining that the quantum critical point is smaller than a minimum threshold value, iteratively change a design of at least one of the physical elements of the qubit design to obtain a revised qubit design;
form a revised plurality of plaquettes, the revised plurality of plaquettes comprising at least one revised plaquette, representing the at least one changed physical element design of the revised qubit design, each plaquette having at least two ports, each plaquette concatenated to another plaquette via the at least two ports;
obtain a revised representation of the revised qubit design from the revised plurality of plaquettes;
extract a value of inductance (L), a value of capacitance (C) of the revised qubit design and a value of a mutual inductance M between at least one physical element communicatively coupled to the revised qubit design and the revised qubit design;
compute one or more energy scales of the revised qubit design from a quantum modeling environment via the extracted values of L, C and M;

compute a quantum critical point of the revised qubit design; and determine whether the quantum critical point is greater than a minimum threshold value.

16. The system of claim 15 wherein the at least one non-transitory processor-readable medium communicatively coupleable to the at least one digital processor and that stores at least one processor-executable instruction or data which, when executed by the at least one digital processor, causes the at least one digital processor to change the qubit design to obtain a revised qubit design by adding additional L-tuners, removing L-tuners, changing the design of couplers, and changing a magnitude of an induction coil between the qubit and a first element of a readout.

* * * * *

UNITED STATES PATENT AND TRADEMARK OFFICE
CERTIFICATE OF CORRECTION

PATENT NO. : 11,514,223 B2
APPLICATION NO. : 17/068388
DATED : November 29, 2022
INVENTOR(S) : Reza Molavi It is certified that error appears in the above-identified patent and that said Letters Patent is hereby corrected as shown below:

In the Specification

Column 1, Line 49:

"$H_D \propto 1/2 \, \Sigma_{i=1}{}^N \Delta i \sigma_i^x$"

Should read:

-- $H_D \propto -\frac{1}{2} \Sigma_{i=1}^N \Delta_i \sigma_i^x$ --.

Column 1, Line 60:

"$H_p \propto -\frac{\varepsilon}{2}\left[\sum_{i=1}^N h_i \sigma_i^z + \sum_{j>i}^N J_{ij} \sigma_i^z \sigma_j^z\right]$"

Should read:

-- $H_p \propto -\frac{\varepsilon}{2}\left[\sum_{i=1}^N h_i \sigma_i^z + \sum_{j>i}^N J_{ij} \sigma_i^z \sigma_j^z\right]$ --.

Signed and Sealed this
Seventh Day of March, 2023

Katherine Kelly Vidal
*Director of the United States Patent and Trademark Office*